(12) United States Patent
Quintiliano

(10) Patent No.: US 7,634,679 B2
(45) Date of Patent: Dec. 15, 2009

(54) REMOTE LOCATION FAILOVER SERVER APPLICATION

(75) Inventor: Daniel Quintiliano, Manassas, VA (US)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 11/289,354

(22) Filed: Nov. 30, 2005

(65) Prior Publication Data

US 2007/0168692 A1 Jul. 19, 2007

(51) Int. Cl.
*G06F 11/00* (2006.01)

(52) U.S. Cl. ............ 714/4; 714/6; 714/7; 714/12; 714/18; 714/45

(58) Field of Classification Search .......... 714/4, 714/6, 7, 12, 18, 45
See application file for complete search history.

(56) References Cited

U.S. PATENT DOCUMENTS

| 7,100,070 B2 * | 8/2006 | Iwamura et al. ........... 714/4 |
| 7,107,485 B2 * | 9/2006 | Baba et al. ............... 714/13 |
| 2004/0158766 A1 * | 8/2004 | Liccione et al. .......... 714/4 |

* cited by examiner

*Primary Examiner*—Robert Beausoliel
*Assistant Examiner*—Charles Ehne
(74) *Attorney, Agent, or Firm*—Shook, Hardy & Bacon L.L.P.

(57) ABSTRACT

A method and system for performing a failover process on a production server. A source server and disaster recovery server are assigned indicators when operating in failover mode. A version match is performed to validate that the Exchange server applications and the storage area network vendor resources are compatible for the source and disaster recovery servers. Thereafter, multiple mailbox stores are dismounted on the source mailbox server. In turn, multiple databases and multiple transaction log drives are dismounted. After this step, drives are mounted in the disaster recovery location that are mirrors of the source server database and transaction log drives. After mounting, an Exchange System Attendant resource is created or Exchange and user attributes are updated in Active Directory. Finally, Exchange services are started and mailbox stores are mounted on the disaster recovery server.

7 Claims, 7 Drawing Sheets

REMOTE LOCATION FAILOVER SERVER APPLICATION

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Many companies rely on huge data network infrastructures to send communications locally and via the Internet. Conventionally, multiple storage devices can be used to keep track of these numerous communications. An example of a commonly used tool for providing messaging and data storing services is Microsoft Exchange Server 2003. The companies that rely on the Exchange Server tool can be referred as Exchange organizations.

Exchange organizations typically have requirements for protecting sensitive data, performing forensic study, and ensuring corporate or legal compliance. These requirements often include up-to-date or near-up-to-date recovery of user mailbox data to a remote geographic location. Conventional restoration tools, involving tape or other forms of removable media, fail to meet the up-to-date or near-up-to-date mailbox data availability requirements.

Accordingly, a need exists for administrator-controlled failovers of Exchange data to a remote geographic location in a controlled or uncontrolled scenario from anywhere on a network.

SUMMARY

In an embodiment, the invention provides a system and method for performing a failover that operates directly with the production and disaster recovery sites from anywhere on the network without any special Exchange Server configurations. The invention provides a recovery option for Exchange Server 2003 users seeking to continue messaging operations in a remote location with up-to-date or near-up-to-date user mailbox data. Furthermore, the invention provides a user access to up-to-date or near-up-to-date user mailbox data availability while using storage devices and data replication technologies of their choice.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

I. Overview

Embodiments of the invention provide a system and method for performing failover operations on an Exchange server. For example, the invention integrates storage area network (SAN) technology with Exchange server applications via a series of operations described in various embodiments.

During operation of a computer network, servers providing one or more functions may shut down or otherwise cease to provide the function, such as due to a internal or external catastrophic failure. For example, servers providing functions supporting the operation of Microsoft Exchange may shut down, lose connectivity to the network or be destroyed, either in a planned manner or in an unexpected manner. When a server stops providing the desired Exchange functions for users in a geographic location, it is preferably for the functions to be taken over by another server in a remote geographic location, such as a disaster recovery site. The process of having a server in a remote geographic location take over the functions of another server due to a planned or unexpected halt in server operation is referred to as a failover. A planned failover can also be referred to as a soft failover, while a failover due to an unexpected stop in operation of a server or the destruction of the production geographic site can be referred to as an unplanned or hard failover.

Figure 1:
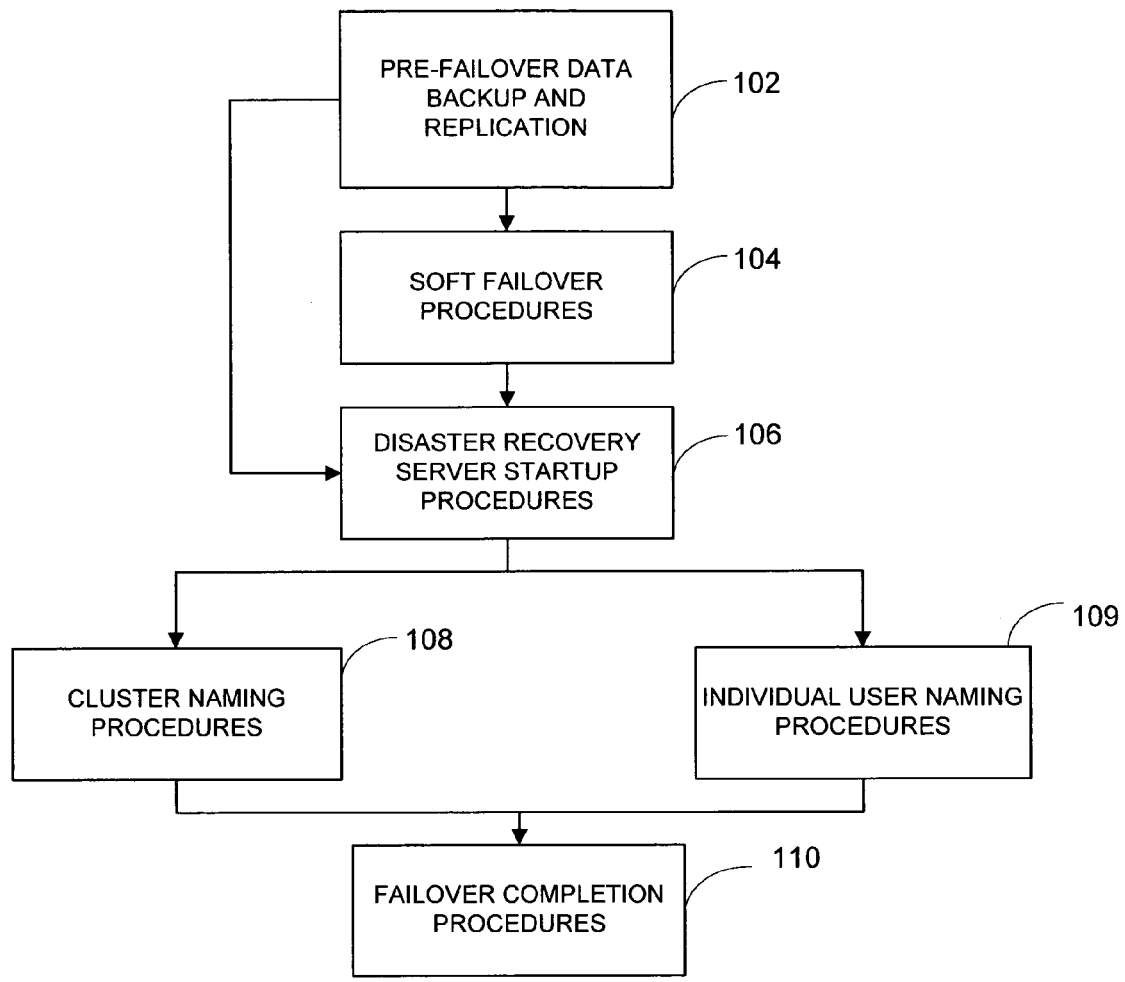
FIG. 1 is a block diagram illustrating an overview of an embodiment of the invention.

FIG. 1 provides an overview of a failover process according to an embodiment of the invention. Pre-failover data collection 102 represents data replication that takes place on a snapshot backup of the production database and the latest transaction logs of a production Exchange server prior to a failover process. The replicated production server can include multiple replicated database snapshots, replicated transaction logs, and replicated disk volumes. Soft failover procedures 104 represent voluntary steps that can be taken when a production server is shut down in a planned manner. Disaster recovery server startup procedures 106 represent a second set of procedures that are used for both planned and unexpected failovers. After performing the disaster recovery server startup procedures 106, the configuration of the disaster recovery Exchange server is performed. This can be done using cluster naming procedures 108 or individual user naming procedures 109. The final steps required to complete the failover 110 are then performed.

II. Pre-Failover Data Backup and Replication

In an embodiment, a tool performs a snapshot backup of the Exchange data and the data replication service replicates these backups. The snapshot backup tool can preferably use Microsoft Windows Volume Shadow Copy Services to ensure fast, supportable backups of Exchange. Additionally, the snapshot backup tool can be configured to take snapshots of one or more databases and their associated transaction logs according to a schedule, such as every 12 hours, or every 24 hours, or once a week. The data replication service can then replicate these backups on a schedule to a remote geographic location. Preferably, the data replication service supports the storage vendor that Exchange Server uses. The data replicated by the data replication service is stored on a disaster recovery Exchange server's storage device, such as a disaster recovery storage device located at a remote facility.

In another embodiment, Exchange server data can also be transmitted to a disaster recovery Exchange server using continuous asynchronous or scheduled operations. For example, transaction logs can be replicated to a disaster recovery Exchange server in a continuous asynchronous or scheduled manner to provide current information about the state of the Exchange databases to the disaster recovery server. The continuous asynchronous or scheduled replication of Exchange transaction logs can complement snapshot backups of the Exchange databases which are made on a periodic basis. In an embodiment, the continuous asynchronous or scheduled replication of Exchange transaction logs over a wide area network (WAN) can be used in conjunction with Exchange data that has been backed up using the snapshot backup tool. Software for performing such replication is conventionally available. Alternatively, any replication service can be used that replicates data, guarantees write order fidelity and guarantees that partial files will not be replicated until completely written to the production storage device.

Figure 2:
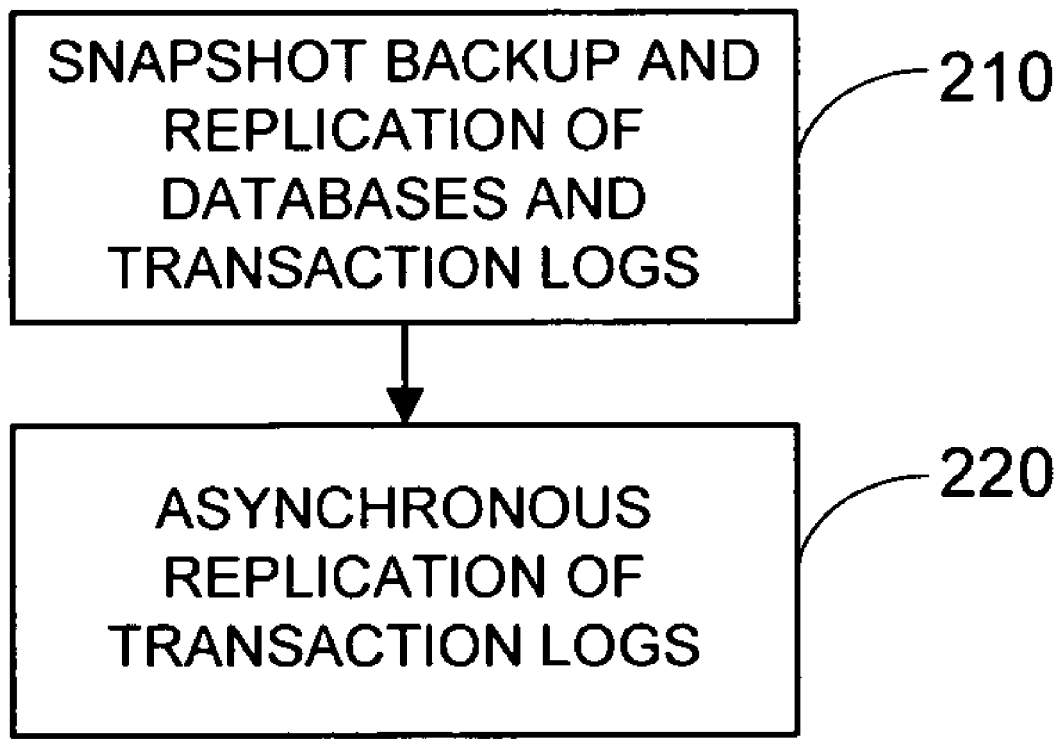
FIG. 2 is a flowchart illustrating a process in accordance with an embodiment of the invention.

FIG. 2 shows an example of pre-failover data backup and replication processes that can be incorporated into a failover process according to an embodiment of the invention. In FIG. 2, daily snapshot backup and replication process 210 allows a complete copy of the current state of all databases and transaction logs to be made and stored at a disaster recovery storage device or a storage device located at a remote location. In other embodiments, the frequency of the snapshot backup and replication process can be set to any convenient interval. Asynchronous transaction log replication 220 provides updates to a disaster recovery server for any transactions that take place between the periodic snapshots of the transaction logs.

III. Disaster Recovery Server Startup Procedures

In various embodiments, the invention provides procedures for allowing a disaster recovery server to take over operation of one or more functions from a production server that has shut down or has been destroyed. Although this is referred to as a startup procedure, this does not imply that the target server was powered down or otherwise inactive prior to taking over operations. Rather, the startup procedures provided in various embodiments of the invention are in contrast to the passive role of receiving replicated data that was being performed by the disaster recovery storage device prior to the failover.

In an embodiment, a failover method can include several procedures that are performed during startup of a disaster recovery server. These procedures include, but are not limited to, detecting a failover of an Exchange server; issuing a storage area network (SAN) command to mount at least one database drive and at least one log drive; determining a configuration domain controller corresponding to the disaster recovery Exchange server for writing directory updates; creating a cluster IP address resource; and assigning the cluster network name to the disaster recovery server.

In such an embodiment, the method begins by detecting a failover at a first Exchange server. The first Exchange server can represent a production Exchange server for providing the functions of Microsoft Exchange. The detected failover can be either a soft failover or a hard failover. Based on the detected failover, a storage area network (SAN) command can be issued to mount one or more drives containing database snapshots and/or transaction logs from the first Exchange server. The databases and log drives are mounted at a second, disaster recovery Exchange server that will take over the functions of the first Exchange server.

If the drives containing the database and transaction log replicas fail to mount for some reason, the failure to mount can be detected before any further steps are taken. Instead, the issues causing the drive not to mount can be identified, and after resolving the issue the mount process can be started again. For example, a set of storage vendor tools can be used to run a check to determine why a databases or transaction logs drive did not mount on to the second Exchange server. Alternatively, a user could run a series of checks via a computer to determine why the databases or transaction logs did not mount on to the second Exchange server. One way to rectify the identified issues, for example, may be to manually mount the drive of the attempted mounted database or transaction logs using storage vendor tools.

After mounting, the one or more transaction logs can be replayed to update the mounted databases. This allows the database snapshot to be updated with any actions that have occurred since the snapshot was formed and replicated on the disaster recovery storage device. After replaying the transaction logs, the database on the target server should be able to provide Exchange server state to users that is similar to the state of the first Exchange server prior to the start of the failover.

After updating the database or databases by replaying the transaction logs, a configuration domain controller can be determined that corresponds to the configuration domain controller used by the disaster recovery Exchange server to save updates to a database or transaction log file path. An Exchange server can have multiple domain controllers. In addition to a domain controller for the configuration, an Exchange server will also use Global Catalog servers. The configuration domain controller includes any domain controller that Microsoft Exchange Server 2003 uses for configuration information. In an alternate embodiment, a cluster IP address resource can be started, the Network Name of the first Exchange server can be assigned to the disaster recovery Exchange server and an Exchange System Attendant resource can be created on the disaster recovery Exchange server.

Figure 3:
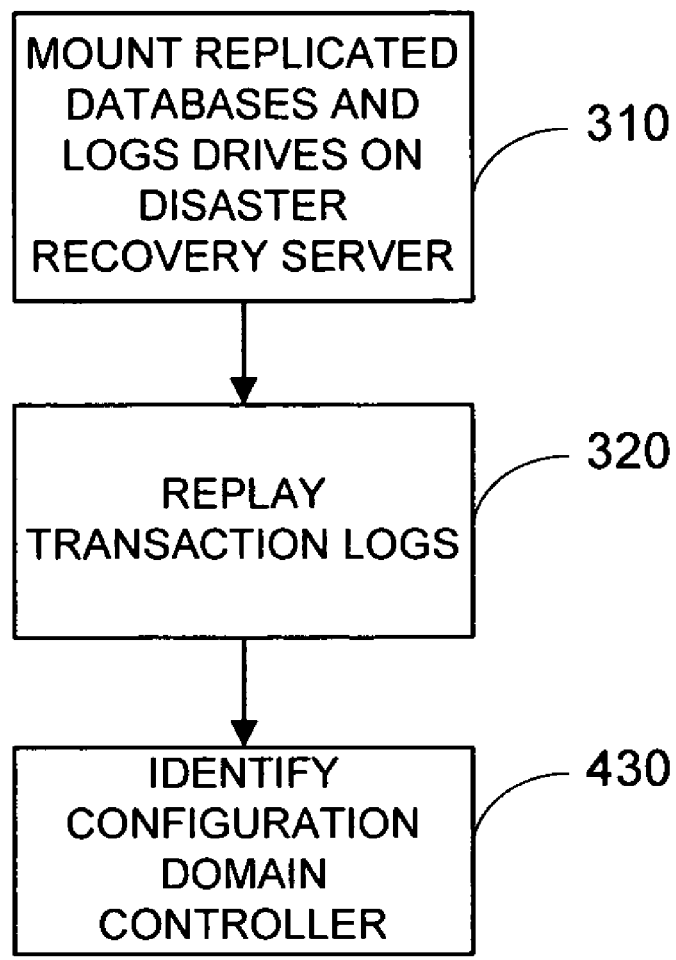
FIG. 3 is a flowchart illustrating another process in accordance with an embodiment of the invention.

FIG. 3 provides an example of procedures for starting a disaster recovery Exchange server in accordance with an embodiment of the invention. In FIG. 3, drives containing one or more replicated databases and/or transaction log drives are mounted 310 on a disaster recovery Exchange server. One or more transaction logs are replayed 320 to update the mounted databases. A configuration domain controller is then determined 330 that corresponds to the configuration domain controller for the disaster recovery Exchange server for any Active Directory changes that need to be made.

IV. Namespace Management—Server Cluster

After the startup procedures are finished, the namespace for the production Exchange server is transferred to the disaster recovery server. In an embodiment, the first Exchange server is named using a cluster naming service, such as Microsoft Cluster service. In such an embodiment, a virtual namespace is overlaid on top of the physical names of the devices in the cluster. Because a virtual namespace already exists, transferring the namespace can be accomplished by pointing any virtual names that have a corresponding physical counterpart to the physical names corresponding to the target server. For example, the virtual names of the databases containing the Exchange information will typically have a corresponding physical counterpart. However, the virtual names for mailboxes of individual users will typically only reference another virtual name. If both the production Exchange server and the disaster recovery server are clusters, then the transfer of the namespace can be accomplished using a cluster naming service.

To transfer the namespace of a cluster, an IP address resource is brought online on the target server. An example of such a resource is the Exchange IP Address Resource. The IP address resource can then be used to create a Network Name resource on the disaster recovery server. The Network Name resource is a resource providing a listing of how virtual names correspond to physical names. The Network Name resource formed on the disaster recovery server should have the same virtual names as the network name resource from the production Exchange server. Once the Network Name resource is formed, the Network Name resource can be activated to allow routing using the virtual namespace. Preferably, a System Attendant resource is then created for the disaster recovery server that uses the same name as the System Attendant resource from the production server. This allows Exchange to be started on the disaster recovery server in the exact configuration as the production server.

Figure 4:
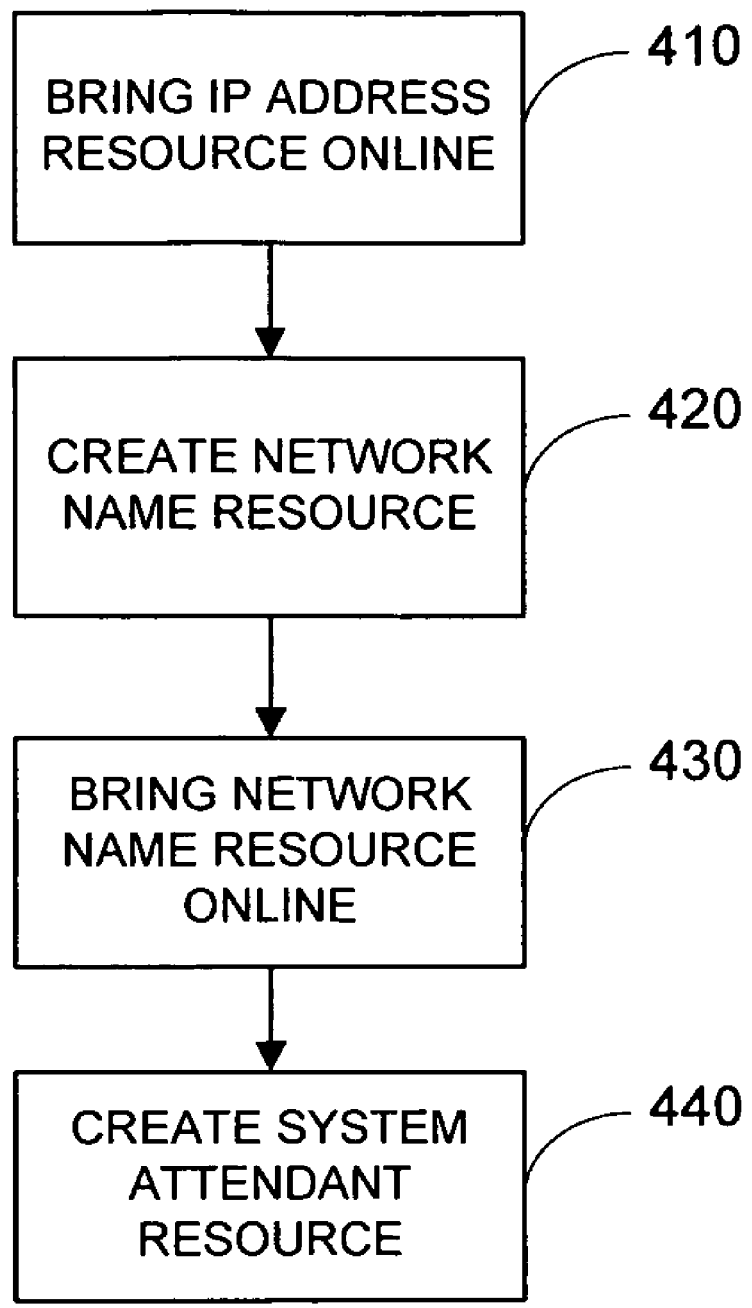
FIG. 4 is a flowchart illustrating still another process in accordance with an embodiment of the invention.

FIG. 4 provides an example of transferring a namespace for a cluster according to an embodiment of the invention. First, an IP address resource is brought online 410. The IP address resource is then used to create 420 a Network Name resource. The network name resource is then activated 430. Finally, a System Attendant resource is created 440.

V. Namespace Management—Non-Cluster Server

In an alternative embodiment, either the production Exchange server or the disaster recovery server may not use a cluster service to provide a virtual namespace. In such an embodiment, transferring the namespace to the disaster recovery server involves updating the physical names of any and all Exchange components. For example, mailboxes of individual users will need to be correlated to the naming convention and logical configuration of the disaster recovery server.

Figure 5:
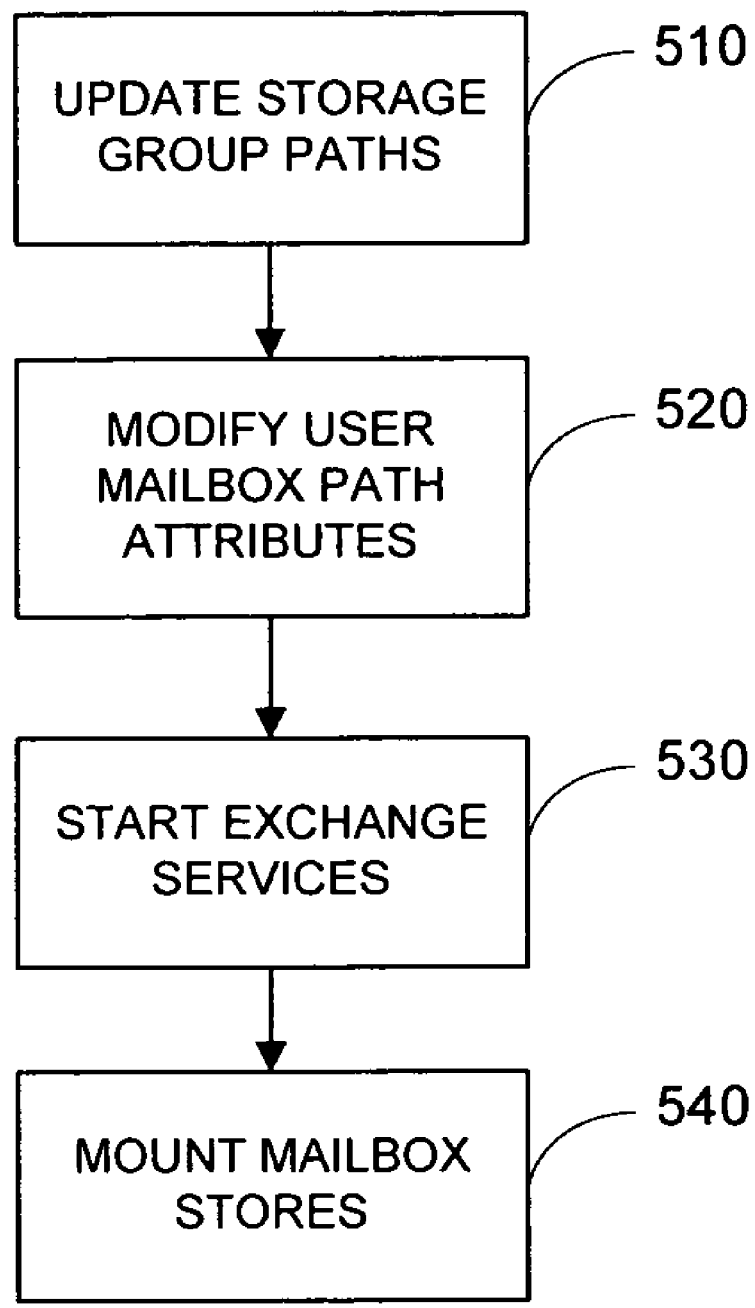
FIG. 5 is a block diagram illustrating yet another process in accordance with an embodiment of the invention.

In an embodiment, the namespace transfer can be accomplished using Active Directory. An example of such an embodiment is depicted in FIG. 5. In FIG. 5, a first step in transferring the namespace can be updating 510 the storage group paths for the disaster recovery server. After updating 510 the storage group paths, the user mailbox attributes for each user can be modified 520 to reflect the new logical configuration of the mailbox stores and server name of the disaster recovery server. Having accomplished the namespace transfer, the Exchange services can be started 530 on the disaster recovery server and the mailbox stores can be mounted 540.

VI. Completing the Failover

In an embodiment, a few additional steps can be performed after transferring the namespace. One additional step is to update the user mailbox paths on any additional domain controllers within Active Directory. The failover procedure provides for an update to the configuration domain controller, but other domain controllers can also be updated. More generally, if the Exchange server is part of a larger network, such as a corporate WAN, any references to the production Exchange server in the larger network can be updated to refer to the disaster recovery server faster than normal Active Directory replication is scheduled. Another additional step is to save the log file from the failover. Saving the log file allows the log to be analyzed to detect any unusual occurrences during the failover.

VII. Soft Failover Procedures

Figure 6:
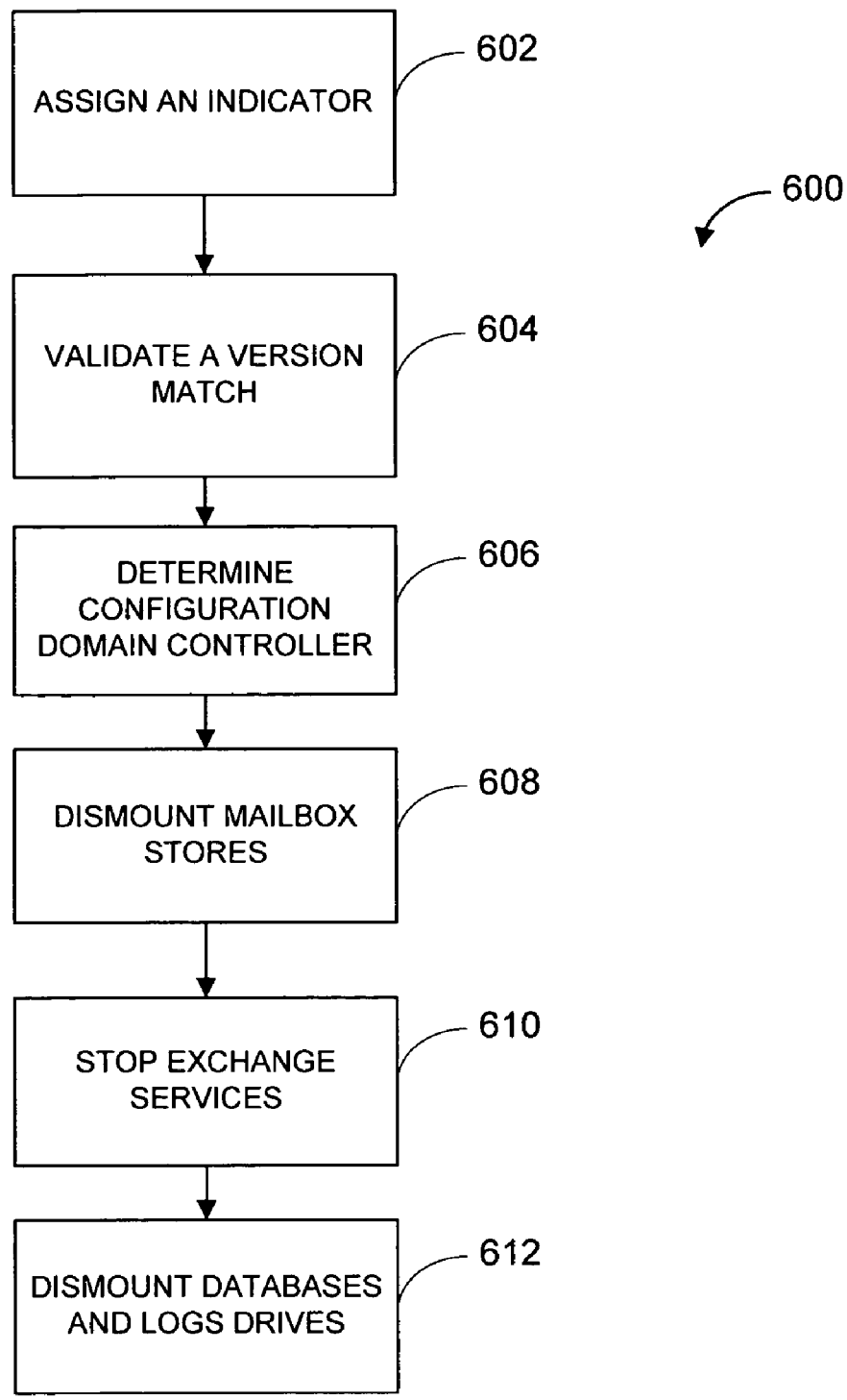
FIG. 6 is a block diagram illustrating still another process in accordance with an embodiment of the invention.

In another embodiment, the invention can also be used for a soft failover, where the failover is planned or otherwise initiated voluntarily. During a soft failover, a number of steps can be taken to stop the production Exchange server in an orderly manner. These steps occur prior to the steps for starting up a disaster recovery server. FIG. 6 provides an example of a flowchart for executing a soft failover in accordance with an embodiment of the invention. In FIG. 6, an indicator is assigned 602 to a production Exchange server. A version match for an Exchange server and storage area network (SAN) vendor is validated 604 on the production Exchange server and on a disaster recovery Exchange server (the target server). Next, one or more mailbox stores are dismounted 608 on the production Exchange server. After dismounting the mailbox stores, Exchange services can be stopped 610. Finally, if the Exchange services are stopped, the databases and transaction logs associated with Exchange can be dismounted 612. As indicated in FIG. 1, after these soft failover steps, the method can continue with disaster recovery server startup procedures as in a hard failover.

VIII. Additional Automation and Updating for Failovers

Figure 7:
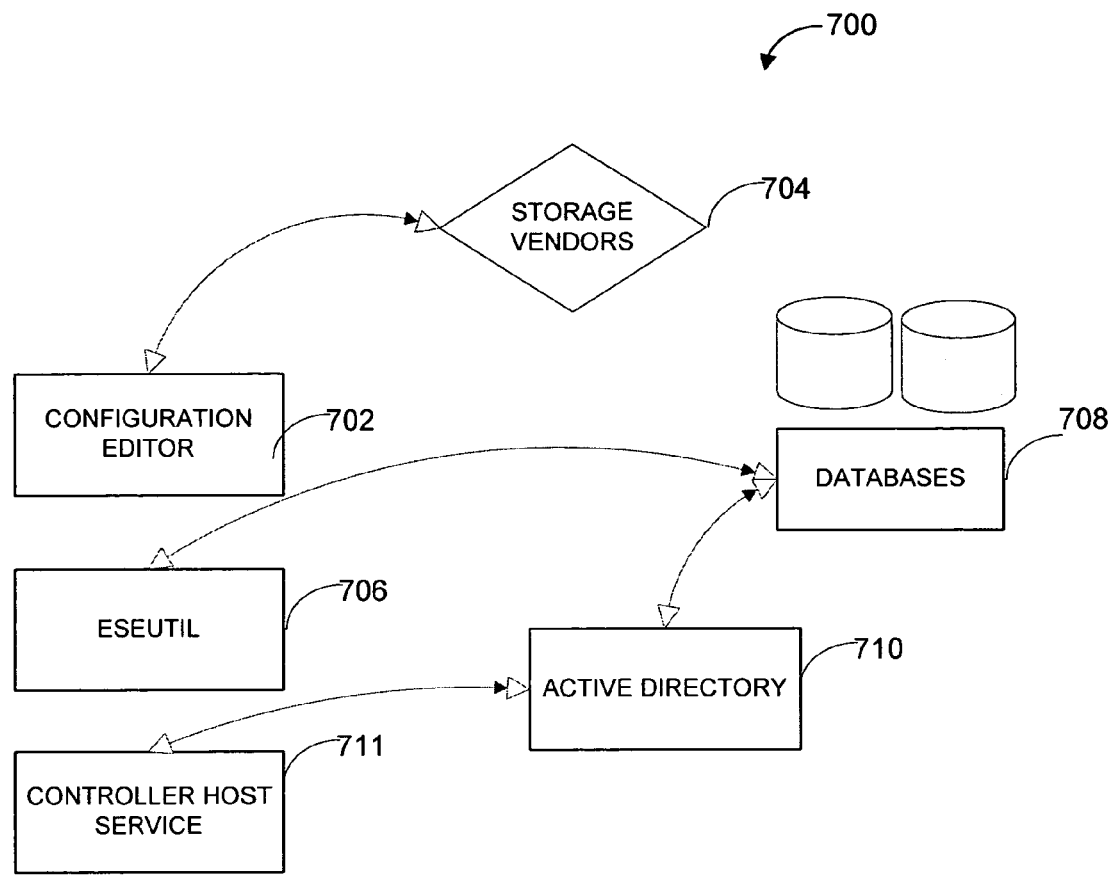
FIG. 7 schematically shows a system in accordance with an embodiment of the invention.

FIG. 7 provides an example of a block diagram 700 illustrating components of the system in accordance with an embodiment of the invention. In FIG. 7, a configuration editor component 702 is shown managing multiple storage vendors' storage device configurations 704. The Microsoft Exchange database utility Eseutil.exe application 706 is also shown performing a soft recovery on all databases 708. FIG. 7 also shows updates to the Active Directory component 710 by the Controller Host service 711 having an impact to all user mailboxes located in production server databases 708.

In an embodiment, the invention provides a system that is compatible with pre-programmed storage vendors. One example of compatibility is a configuration editor component designed and tested for several popular storage vendors. Additional pre-programmed storage vendor compatibility can be added to the code base by testing and evaluating the storage vendors. In one embodiment, the configuration editor component can save storage vendor information corresponding to the storage device type, drive content, Logical Unit Number (LUN), disk, and volume mappings. As a result, the storage vendor information can be further processed by a controller host service that runs on the production server and the target server during a failover operation. Preferably, the storage device type corresponds to a storage device found in the Windows hardware compatibility list.

The Configuration Editor component enables a user to distinguish between back-end storage devices for each Exchange severs on a network. It allows management over multiple storage vendors in a single user interface. The user interface can provide multiple specific storage vendor tools to be used that are capable of being installed on the Exchange server. Preferably, the administrator browses the vendor utility on the server to allow actions against the storage devices to be instantiated.

In still another embodiment, a Configuration Editor component allows an administrator to pre-set the mappings for the Exchange database and transaction log files for an unlimited number of production servers to specific LUNs or disks on a storage device. The information is saved in a configuration file on each server and may be imported to additional servers to mount or dismount the proper disks during the failover process.

In alternate embodiment, the configuration editor component can automatically map the drive letters, disk numbers, and volumes for the Exchange database and log files. This allows the system to access the data in order to mount or dismount disks for a failover process.

In an embodiment, the system may defer to the Controller Host component to make updates to Active Directory component on choices that were made for the production and disaster recovery servers in the user interface. One possible order to perform the updates, for example, may be first updating the database and transaction log file paths in Active Directory on the disaster recovery Exchange server's configuration domain controller. Alternatively, the administrator may choose additional domain controllers to make updates on. The data for the update to the database and transaction log paths can be found in Active Directory based on the source server name.

In still another embodiment, the system may determine the names of the users who had active, or connected, mailboxes on the failed server (e.g. source server) by linking to each mailbox store on the source server and enumerating the values found in an Active Directory attribute.

In such an embodiment, each value in the attribute may be set as a distinguished name (DN) for each user who has a connected mailbox. The values may then be used, one at a time, to be linked to the user accounts on a domain controller in a disaster recovery location. As a result, attribute values can be updated with the values of the disaster recovery location.

In still another embodiment, when a failover occurs during database or transaction log replication, the system can allow administrators to choose between mounting the last known state of the production server, or the disks that were in the process of replicating during a disaster. By accessing the automated disk, volume, and LUN management features, the administrator may choose to mount the last snapshot. As a result, the system can automatically mount the disks based on the data in the configuration editor and can run a soft recovery against the Exchange databases, such as by using the Eseutil.exe application.

One possible result, for example, is that the system may then proceed with the rest of the failover processes that include, but not limited to, updating Active Directory, starting Exchange services, and mounting the mailbox stores on a disaster recovery server. Alternatively, if the administrator chooses to mount the partially replicated disks on the disaster recovery storage device, the Eseutil.exe application may perform a soft recovery and a consistency check to report to the administrator the output of the results of the tests. The administrator can then make decisions to mount the disks or to mount the last replicated data snapshots and move forward with the failover process.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and non-removable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for performing a failover on a mail Exchange server, the method comprising:

receiving one or more periodic snapshot backups of a first Exchange server's data that are generated by a snapshot tool utilizing a volume shadow copy service application, wherein a periodic snapshot backup provides one of a complete copy of a current state of one or more databases and transaction logs at the first Exchange server or an update to a previous periodic snapshot backup;

receiving a replication of one or more transaction logs that provide current state information for one or more databases at the first Exchange server, wherein the one or more transaction logs are replicated on one of a continuous, asynchronous, or scheduled basis, and wherein the replication provides an update to a most recent periodic snapshot backup;

detecting a failover at the first Exchange server, the first Exchange server having a network name;

automatically issuing a storage area network command to mount at least one database and at least one transaction log drive, the database and the transaction log drive being mounted at a second Exchange server;

identifying a failure of one or more of the at least one database and the at least one transaction log drive to mount;

rectifying the failure of the one or more of the at least one database and the at least one transaction log drive to mount, wherein the failure to mount is rectified by one or more of remounting the at least one database or the at least one transaction log drive, manually mounting the at least one database or the at least one transaction log drive, mounting a most recent periodic snapshot backup of the at least one database, and providing a soft recovery of the at least one database or transaction log drive;

replaying one or more transaction logs to update the mounted database;

determining global catalog servers and a configuration domain controller corresponding to the second Exchange server that is useable by the second Exchange server to save updates to a database or transaction log files;

starting an IP address resource service to create a network name resource on the second Exchange server, wherein the network name resource includes a listing of one or more corresponding virtual names and physical names;

assigning the network name of the first Exchange server to the second Exchange server;

creating a System Attendant resource for the second Exchange server that uses the same name as a system attendant resource on the first Exchange server;

starting one or more Exchange operations on the second Exchange server in the same configuration as the first Exchange server; and storing one or more log files generated by a failover process.

2. The method according to claim 1, further comprising: restarting a failover on the second Exchange server.

3. The method according to claim 1, further comprising: verifying a mount status for the at least one database and the at least one transaction log.

4. The method according to claim 1, wherein the second Exchange server includes a disaster recovery server.

5. A method for performing a failover on an Exchange server, the method comprising:

receiving one or more periodic snapshot backups of a first Exchange server's data that are generated by a snapshot tool utilizing a volume shadow copy service application, wherein a periodic snapshot backup provides one of a complete copy of a current state of one or more databases and transaction logs at the first Exchange server or an update to a previous periodic snapshot backup;

storing the one or more periodic snapshot backups in at least one database in a storage area network, wherein the storage area network includes storage at one or more storage vendors, and wherein the one or more storage vendors are selected by a user;

detecting a failover at a first Exchange server;

issuing a storage area network command to mount the at least one database and at least one log drive, the database and the log drive being mounted at a second Exchange server, wherein the second Exchange server includes a disaster recovery server;

verifying a mount status for the at least one database and the at least one transaction log drive;

identifying issues with the mount status of the at least one database and the at least one transaction log drive at the second Exchange server;

rectifying the issues by one or more of remounting the at least on database or the at least one transaction log drive, manually mounting the at least one database or the at least on transaction log drive, mounting a most recent periodic snapshot backup of the at least one database, and providing a soft recovery of the at least one database or transaction log drive via a database utility application;

replaying one or more transaction logs to update the mounted database;

identifying issues with said database and said transaction log;

rectifying the identified issues for said database and said transaction log;

determining a configuration domain controller corresponding to the second Exchange server;

updating one or more storage group paths at the second Exchange server;

modifying a plurality of user path attributes at the second Exchange server;

mounting mailbox stores at the second Exchange server; and storing one or more log files generated by a failover process.

6. The method according to claim 5, further comprising: starting Exchange services on the second Exchange server.

7. The method according to claim 5, further comprising: restarting a failover on the second Exchange server.

* * * * *

UNITED STATES PATENT AND TRADEMARK OFFICE
CERTIFICATE OF CORRECTION

PATENT NO. : 7,634,679 B2
APPLICATION NO. : 11/289354
DATED : December 15, 2009
INVENTOR(S) : Daniel Quintiliano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this

Ninth Day of November, 2010

David J. Kappos
*Director of the United States Patent and Trademark Office*